Nov. 22, 1949   F. W. W. MORLEY   2,488,875
GAS TURBINE ENGINE

Filed April 30, 1948   2 Sheets-Sheet 1

INVENTOR
F. W. W. MORLEY
by Wilkinson Mawhinney
ATTORNEYS

Nov. 22, 1949   F. W. W. MORLEY   2,488,875
GAS TURBINE ENGINE
Filed April 30, 1948   2 Sheets-Sheet 2

INVENTOR.
F. W. W. MORLEY
by Wilkinson Mawhinney
ATTORNEYS

Patented Nov. 22, 1949

2,488,875

UNITED STATES PATENT OFFICE 2,488,875

GAS TURBINE ENGINE

Frederick William Walton Morley, Aston-on-Trent, England, assignor to Rolls-Royce Limited, Derby, England, a British company Application April 30, 1948, Serial No. 24,157
In Great Britain May 7, 1947

5 Claims. (Cl. 253—65)

This invention relates to gas-turbine engines and more particularly is concerned with nozzle-guide vane assemblies for gas-turbines of the axial type.

In order to avoid as far as possible thermal stressing of the blading of the guide-vane assembly in operation of the engine, it is desirable to construct the nozzle-guide vane assembly in such a manner as to allow radial freedom of the blading in the supporting structure. Various proposals have been made for this purpose, some of which have been adopted in practice; for instance, the blading has been formed with inner and outer platforms which were supported in inner and outer rings in a manner allowing a limited radial freedom between the platforms and the rings.

The object of the present invention is to provide a nozzle-guide vane assembly having the desired characteristics and other advantages including simplicity of assembly and durability in operation.

According to the present invention, there is provided a multi-stage axial-flow gas turbine comprising a turbine casing; a plurality of interconnected axially-spaced turbine rotor discs rotatively mounted in the casing, each rotor disc carrying rotor blading; an annular spacer member extending between and engaged coaxially with a pair of rotor discs to hold them in axially spaced relation, said spacer member rotating with the discs and being formed externally as a rotating part of a labyrinth gas seal between the pair of discs; and a nozzle guide vane assembly supported from the casing to be located between said pair of rotor discs and to encircle the spacer member, said nozzle guide vane assembly comprising a plurality of segmental elements arranged to form a turbine nozzle annulus between the rotor blading carried by the said pair of rotor discs, each segmental element having an outer platform, an inner platform and vane means interconnecting the platforms, means interconnecting the outer platforms with the turbine casing and locating the outer platforms axially and circumferentially with one another but leaving them radially free, means interconnecting the inner platforms and locating them axially circumferentially and radially with respect to one another, and an annular member disposed around the spacer member and within the inner platforms to co-operate with the spacer member to provide a fixed part of the labyrinth seal, said annular member being located axially of and coaxially with the spacer member solely by the means interconnecting the inner platforms.

Preferably the inner platforms of the segmental elements are provided each with a radially inwardly extending foot having oppositely-directed axial spigot formations and the means interconnecting the inner platforms comprises a pair of clamping rings formed with shoulders providing annular sockets to engage with the spigot formations and means such as bolts to nip the clamping rings together to hold them in engagement with the axial spigot formations. In such an arrangement the fixing means on the outer platforms may comprise a spigot formed on each platform to extend radially from its surface to engage in a radial aperture or recess in a supporting ring, whereby the platforms are retained in circumferential and axial assembly, whilst relative radial movement is permitted between the spigots and the apertures or recesses.

One construction of gas-turbine-engine will now be described in which the nozzle-guide-vane assembly for the turbine embodies the above and other features of this invention.

The description refers to the accompanying drawings, in which.

Figure 1:
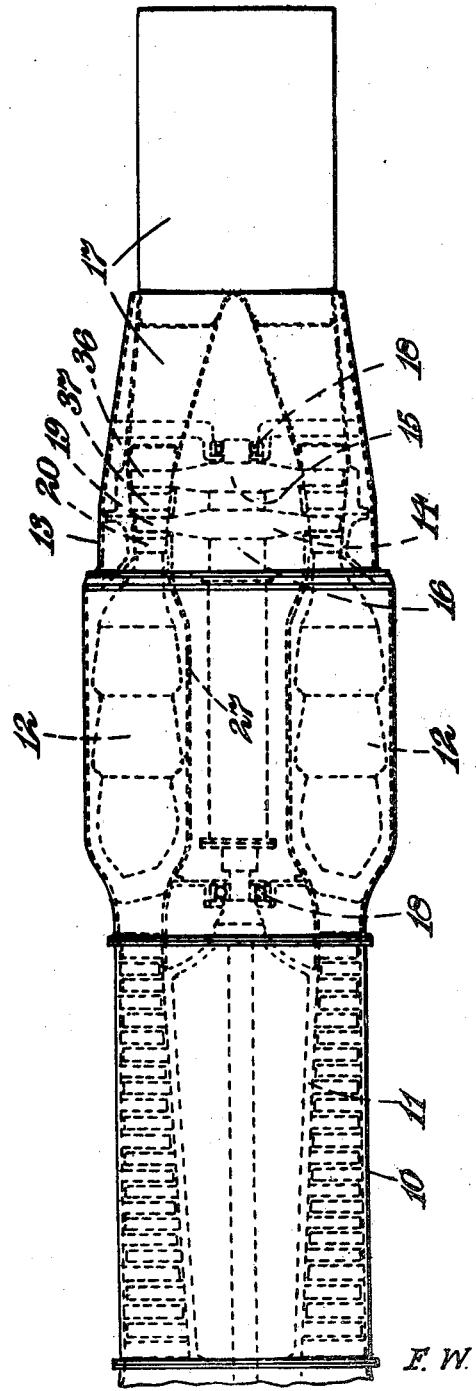
Figure 1 is a diagrammatic view of the gas-turbine-engine.

Referring to Figure 1, the gas-turbine-engine comprises an axial compressor 10 having a rotor 11, combustion equipment 12, a two-stage axial turbine 13 including turbine discs 14, 15, supported on a shaft 16 through which the turbine drives the compressor, and an exhaust assembly 17. The rotor assembly is carried in suitable bearings 18 supported from the stationary engine casing.

As is usual, the compressor 10 delivers air under pressure to the combustion equipment in which fuel is burnt to heat the air, and the hot gases are passed through the turbine 13 to drive it.

Figure 2:
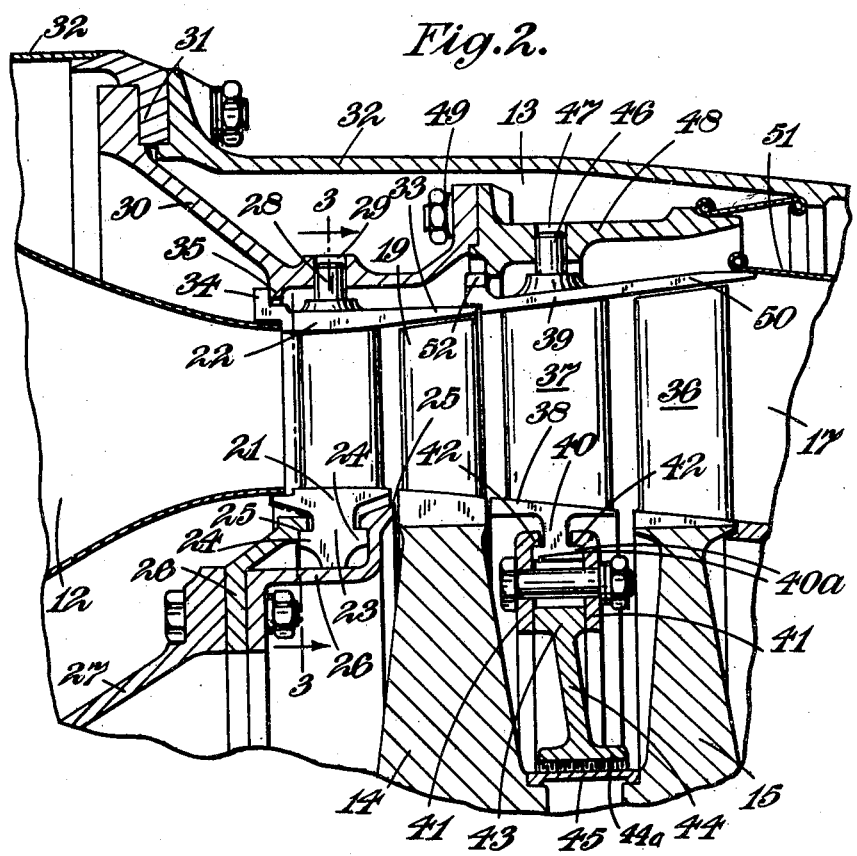
Figure 2 is a fragmentary section through a part of the turbine.
Figure 3:
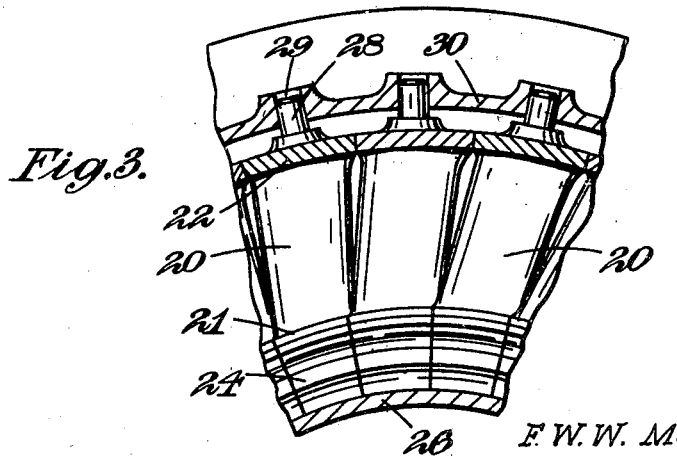
Figure 3 is a section on the line 3—3 of Figure 2.

Referring now to Figures 2 and 3, the turbine disc 14 of the high-pressure turbine stage carries rotating blading 19 and the hot gases are directed from the combustion equipment on to the blading 19 by a nozzle-guide-vane assembly.

The nozzle-guide-vane assembly comprises a series of segmental members each having a guide-vane 20, an inner platform 21, and an outer platform 22. The segmental members, when assembled, form an annular passage for the hot gases across which passage the vanes 20 extend. The segmental members are supported in the following manner.

The inner platform 21 of each segmental member is provided on its surface remote from the vane 20 with an inwardly-extending foot 23 having axially-extending spigot-like formations 24. The spigot-like formations 24 are curved about the axis of the turbine and engage with annular shoulders 25 on a pair of continuous support rings 26. The support rings 26 are bolted together so that they clamp the feet 23 of the segmental members firmly in position and are secured to a part 27 of the engine structure which is connected to the compressor casing. In this manner, the inner platforms of the segmental members are located circumferentially, radially and axially and the nozzle-guide-vane assembly is held coaxially with the turbine.

The outer platform 22 of each segmental member is provided on its surface remote from the vane 20 with a radially-extending, circular-sectioned spigot 28 which engages in a circular socket 29 formed in an outer support ring 30 which is bolted at 31 to the outer casing 32 of the engine. The spigots 28 and support ring 30 locate the outer platforms 22 circumferentially and axially but leaves them radially free to permit expansion of the segmental members relative to the engine structure and to one another.

The outer platforms 22 are also formed on their upstream edges with radially-outwardly extending flanges 34 to co-operate with a surface on a radial flange 35 on the outer support ring 30 to form a seal between the combustion equipment 12 and the space between the platforms 22 and the support ring 30.

The outer platforms are also formed with axial extensions 33 from the downstream edges to form a shroud ring for the blading 19.

The hot gases leaving the blading 19 flow through and are directed onto low-pressure blading 36 by a second nozzle guide-vane assembly which is of generally similar construction to that just described.

Each segmental member comprises a vane 37 extending between an inner platform 38 and an outer platform 39. The inner platform is formed with a foot 40 having oppositely direct axial spigot formations 40a to be gripped between shoulders 42 on a pair of clamping rings 41 which are bolted together. The rings 41 also grip the rim 43 of an annular T-sectioned member 44, the cross-bar 44a of which cooperates with a spacer 45 extending between the turbine discs 14, 15 to provide a labyrinth seal. The inner platforms 38 are thus located with respect to one another axially, circumferentially and radially.

The outer platform 39 carries a radial, cylindrical spigot 46 engaging in circular socket 47 in a second outer support ring 48 which is bolted at 49 to the support ring 30.

It will thus be seen that the outer platforms of the segmental members of the nozzle guide vane assembly for the low-pressure turbine are located axially and circumferentially by the spigots 46, support ring 48 and rings 41, but are radially free to permit expansion relative to the engine structure and to one another. The rings 41 and member 44 are also located axially within the engine by the segmental members.

The platforms 39 are provided at their upstream edges with radial sealing flanges 52 and at their downstream edges with extensions 50 to form a shroud ring for the blading 36 and to spigot into an inner shell of the exhaust assembly 17.

I claim:

1. A multi-stage axial-flow gas turbine comprising a turbine casing; a plurality of interconnected axially-spaced turbine rotor discs rotatively mounted in the casing, each rotor disc carrying rotor blading; an annular spacer member extending between and engaged coaxially with a pair of rotor discs to hold them in axially spaced relation, said spacer member rotating with the discs and being formed externally as a rotating part of a labyrinth gas seal between the pair of discs; and a nozzle guide vane assembly supported from the casing to be located between said pair of rotor discs and to encircle the spacer member, said nozzle guide vane assembly comprising a plurality of segmental elements arranged to form a turbine nozzle annulus between the rotor blading carried by the said pair of rotor discs, each segmental element having an outer platform, an inner platform and vane means interconnecting the platforms, means interconnecting the outer platforms with the turbine casing and locating the outer platforms axially and circumferentially with one another but leaving them radially free, means interconnecting the inner platforms and locating them axially circumferentially and radially with respect to one another, and an annular member disposed around the spacer member and within the inner platforms to co-operate with the spacer member to provide a fixed part of the labyrinth seal, said annular member being located axially of and coaxially with the spacer member solely by the means interconnecting the inner platforms.

2. A multi-stage axial flow gas turbine as claimed in claim 1, wherein said inner platforms are provided each with a radially-inwardly extending foot having oppositely-directed axial spigot formations and the means interconnecting the inner platforms comprises a pair of clamping rings formed with shoulders providing annular sockets to engage with the spigot formations and means to nip the clamping rings together to hold them in engagement with the axial spigot formations.

3. A multi-stage axial flow gas turbine as claimed in claim 2, wherein said annular member providing the fixed part of the labyrinth gas seal has a rim arranged to be gripped by said clamping rings thereby to be located axially of and coaxially with the spacer member.

4. A multi-stage axial flow gas turbine as claimed in claim 1, wherein means interconnecting the outer platforms with the turbine casing comprises a radial spigot on each outer platform which spigot engages in a locating recess in the turbine casing.

5. A multi-stage axial flow gas turbine as claimed in claim 1, wherein the outer platforms are provided each with an integral axial extension beyond the vane means, said axial extensions together forming an outer shroud for the rotor blading carried by a turbine disc.

FREDERICK WILLIAM WALTON MORLEY.

REFERENCES CITED

The following references are of record in the file of this patent:

UNITED STATES PATENTS

| Number | Name | Date |
|---|---|---|
| 2,445,661 | Constant et al. | July 20, 1948 |